United States Patent [19]
Gee-Sung et al.

[11] Patent Number: 5,998,230
[45] Date of Patent: Dec. 7, 1999

[54] METHOD FOR MAKING LIQUID CRYSTAL DISPLAY DEVICE WITH REDUCED MASK STEPS

[75] Inventors: Chae Gee-Sung; Kim Jong-Il; Osamu Yoshida, all of Miyagi-ken, Japan

[73] Assignee: Frontec Incorporated, Japan

[21] Appl. No.: 09/176,787

[22] Filed: Oct. 22, 1998

[51] Int. Cl.[6] .................................................. H01L 21/00
[52] U.S. Cl. ......................... 438/30; 438/157; 438/158; 257/59; 257/72
[58] Field of Search .............................. 438/158, 30, 157, 438/151, 149; 257/59, 72

[56] References Cited

U.S. PATENT DOCUMENTS

5,153,142  10/1992  Hsieh .
5,166,085  11/1992  Wakai et al. .
5,580,796  12/1996  Takizawa et al. .

*Primary Examiner*—George Fourson
*Assistant Examiner*—Long Pham
*Attorney, Agent, or Firm*—Brinks Hofer Gilson & Lione

[57] ABSTRACT

In a method for making a liquid crystal display device, a first conductive film is formed on a substrate, and patterned to form a gate electrode and a gate line; a gate insulating film for covering the gate electrode and the gate line, a semiconductor film, an impurity-doped semiconductor film, and a second conductive film are continuously formed; the second conductive film and the impurity-doped semiconductor film are patterned using a common mask to form a source electrode, a source line, and a drain electrode from the second conductive film and to form an ohmic contact layer from the impurity-doped semiconductor layer; an insulating film is formed onto at least the source electrode, the source line, the drain electrode, and the semiconductor film; the insulating film, the semiconductor film, and the gate insulating film are patterned using a common mask to form a thin film transistor to be in contact with a pixel electrode; a transparent conductive film is deposited on the non-deposited section of the substrate and patterned to form the pixel electrode; and a liquid crystal is enclosed between the resulting thin film transistor substrate and a counter substrate.

4 Claims, 9 Drawing Sheets

FIG. 2B

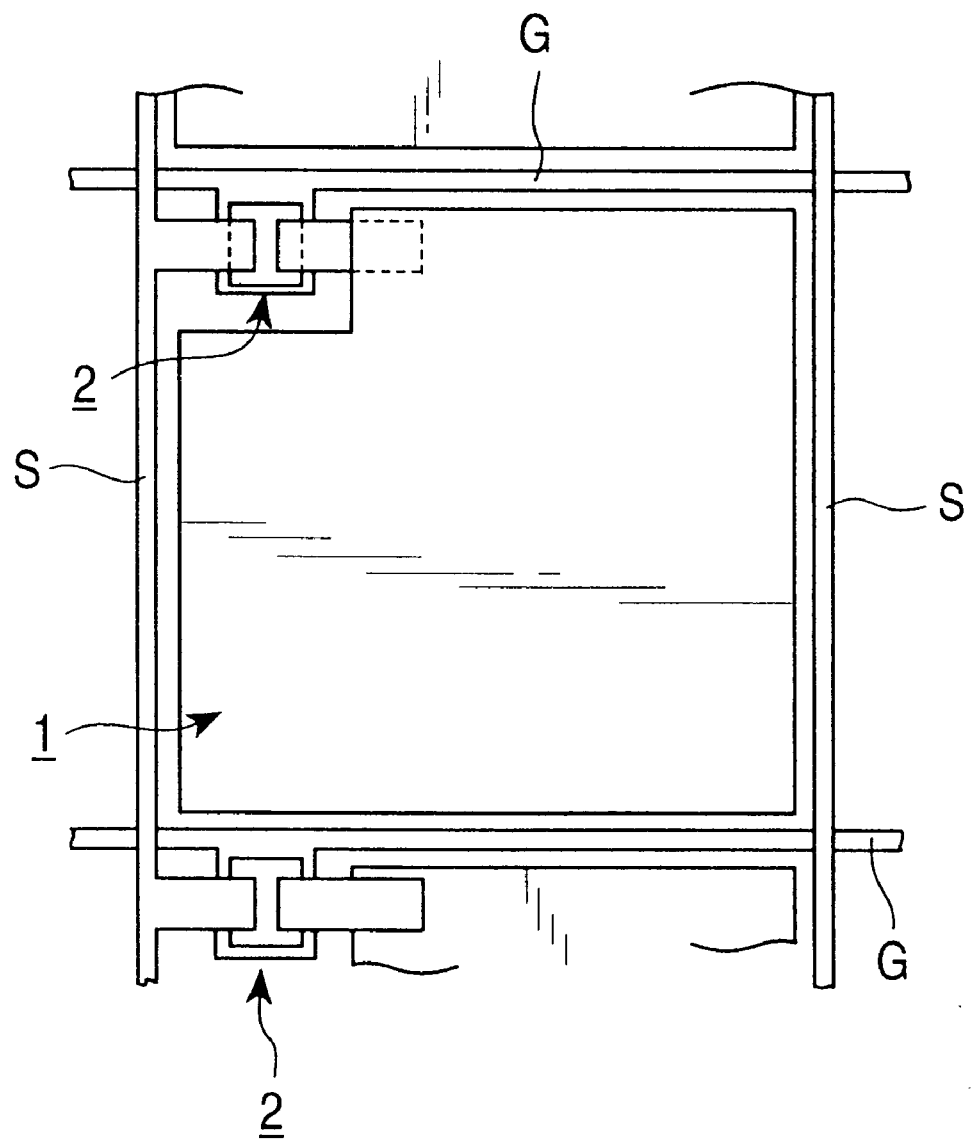

METHOD FOR MAKING LIQUID CRYSTAL DISPLAY DEVICE WITH REDUCED MASK STEPS

BACKGROUND OF THE INVENTION

1. Field of the Invention

The present invention relates to methods for making liquid crystal display devices. In particular, the present invention relates to a method for making a liquid crystal display device using a substrate having a reverse staggered thin film transistor array. The method enables a reduction in the number of photomasks used in the process.

2. Description of the Related Art

FIG. 9 is a schematic diagram of a substrate with a thin film transistor array of a conventional thin film transistor liquid crystal display device. Each segment of the thin film transistor array includes a reverse staggered thin film transistor, a gate line G, and a source line S. A matrix of the gate lines G and the source lines S is arranged on a transparent substrate composed of, for example, glass. Each region surrounded by the gate lines G and the source lines S forms a pixel 1. Each pixel 1 has two thin film transistors 2.

FIGS. 7A to 7E are cross-sectional views showing the production steps of a thin film transistor array substrate, and FIGS. 8A to 8E are plan views showing the steps. With reference to FIGS. 7E and 8E, a gate electrode 4 extracted from a gate line G is formed on a transparent substrate 3. A gate insulating film 5 is formed to cover the gate electrode 4. A semiconductive active film 6 composed of amorphous silicon (a-Si) is formed on the gate insulating film 5 at a position above the gate electrode 4. A source electrode 8 and a drain electrode 9 are formed over the semiconductive active film 6 and the gate insulating film 5 and are extracted to the source line S. An ohmic contact layer 7 intervenes between the source electrode 8 and the semiconductive active film 6 and between the drain electrode 9 and the semiconductive active film 6. These components constitute a thin film transistor 2. A passivating film 10 is formed to cover the thin film transistor 2. A contact hole 11 is formed in the passivating film 10 lying on the drain electrode 9. A pixel electrode 12 composed of a transparent conductive film such as indium tin oxide (hereinafter referred to as ITO) is formed over the contact hole 11 and is electrically connected to the drain electrode 9.

With reference to the left sides in FIGS. 7E and 8E, a gate terminal pad section 13 is arranged on a terminal of the gate line G at the exterior of the display region. In the gate terminal pad section 13, a lower pad layer 14 corresponding to the terminal of the gate line G is formed on the transparent substrate 3, and the gate insulating film 5 and the passivating film 10 are formed on the lower pad layer 14. A contact hole 15 is formed so as to pass through the gate insulating film 5 and the passivating film 10. An upper pad layer 16 is formed over the contact hole 15, in which the upper pad layer 16 is composed of the same transparent conductive film as the pixel electrode 12 and is electrically connected to the lower pad layer 14.

Referring now to production of the thin film transistor array substrate, a conductive film is deposited on a transparent substrate 3, as shown in FIGS. 7A and 8A, and patterned to form a gate electrode 4 and a gate line G. A lower pad layer 14 is formed at a gate terminal pad section 13. With reference to FIGS. 7B and 8B, a gate insulating film 5 is formed to cover the gate electrode 4 and the gate insulating film 5. An a-Si film 18 and then an a-Si:n$^+$ film 19 are deposited thereon and patterned using a photomask to form an island 17 on the gate insulating film 5 above the gate electrode 4. With reference to FIGS. 7C and 8C, a conductive film is formed on the entire surface of the substrate and patterned to form a drain electrode 9, a source electrode 8, and a source line S. The a-Si:n$^+$ film 19 on the channel section of the a-Si film 18 is removed to form an ohmic contact layer 7 composed of the a-Si:n$^+$ film 19.

With reference to FIGS. 7D and 8D, a passivating film 10 is deposited on the entire surface of the substrate and patterned to form a contact hole 11 on the drain electrode 9 and a contact hole 15 on the lower pad layer 14. The contact hole 11 electrically connects the drain electrode 9 and a pixel electrode 12, and the contact hole 15 electrically connects the lower pad layer 14 and an upper pad layer 16. With reference to FIGS. 7E and 8E, an ITO film is deposited on the entire surface of the substrate and patterned to form the pixel electrode 12 and the upper pad layer 16. A conventional thin film transistor array substrate is thereby produced.

The above-mentioned conventional process requires five patterning steps for forming the gate, for forming the island, for forming the source/drain, for forming the contact holes, and for forming the pixel electrode, and thus requires five photomasks (hereinafter the process is referred to as a five-mask process). A reduction in the number of patterning or lithographic steps and thus in the number of photomasks in the production line is eagerly awaited in view of reduction in material and production costs and production period, since the photomasks are expensive and the photolithographic steps require a long process time.

The line material for the gate and source lines must have low electrical resistance and thus a low-resistant metal, such as aluminum or molybdenum is demanded. Aluminum and molybdenum are, however, not resistive against etching of the ITO film (hereinafter referred to as ITO etching). When aluminum or molybdenum is used for the gate and source lines in the above-mentioned conventional process, the exposed positions of the gate and source lines are also etched during etching of the ITO film in the patterning step for the pixel electrode. Thus, the use of aluminum or molybdenum requires a protective film for preventing the metal film from being etched. Accordingly, the use of such a metal requires an additional patterning step using another photomask, in other words, a six-mask process, running counter to the demands of a more simplified process. Compatibility between low resistance of the line material and a reduction in production costs or shortened process time has not been solved by conventional processes.

SUMMARY OF THE INVENTION

Accordingly, it is an object of the present invention to provide a method for making a liquid crystal display device using a reduced number of photomasks with a shortened production time and reduced production costs compared with conventional methods.

It is another object of the present invention to provide a liquid crystal display device suitable for achievement of low resistance of lines.

It is a further object of the present invention to provide a liquid crystal display device in which the exposed region of the gate section is protected from ITO etching.

It is a still further object of the present invention to provide a liquid crystal display device having superior thin film transistor characteristics.

A method for making a liquid crystal display device in accordance with the present invention includes the steps of:

forming a first conductive film on one of a pair of substrates, and patterning the first conductive film to form a gate electrode and a gate line; continuously forming a gate insulating film for covering the gate electrode and the gate line, a semiconductor film, an impurity-doped semiconductor film, and a second conductive film; patterning the second conductive film and the impurity-doped semiconductor film using a common mask to form a source electrode, a source line, and a drain electrode from the second conductive film and to form an ohmic contact layer from the impurity-doped semiconductor layer; forming an insulating film onto at least the source electrode, the source line, the drain electrode, and the semiconductor film; patterning the insulating film, the semiconductor film, and the gate insulating film using a common mask to form a thin film transistor to be in contact with a pixel electrode; depositing and then patterning a transparent conductive film on the non-deposited section of the substrate to form the pixel electrode; and enclosing a liquid crystal between said pair of substrates.

Preferably, the first conductive film is selected from the group consisting of a chromium film, a composite film of an aluminum film with a chromium film deposited thereon, and a composite film of a molybdenum film with a chromium film deposited thereon; and the transparent conductive film comprises an indium tin oxide film.

In the step of depositing the transparent conductive film on the non-deposited section of the substrate, the transparent conductive film may be simultaneously deposited on the gate line and on the region in which the gate electrode is exposed to form a gate protective film.

The gate protective film may be formed while a transparent conductive film electrically connected to the gate electrode is simultaneously deposited on the insulating film to form an upper gate electrode.

BRIEF DESCRIPTION OF THE DRAWINGS

FIGS. 2A to 2E are plan views corresponding to the cross-sectional views of FIGS. 1A to 1E;

FIG. 9 is a schematic diagram of a substrate with a thin film transistor array of a conventional thin film transistor liquid crystal display device.

DESCRIPTION OF THE PREFERRED EMBODIMENTS

Figure 1A:
FIGS. 1A to 1E are cross-sectional views showing production steps of a thin film transistor array substrate of a liquid crystal display device in accordance with a first embodiment of the present invention.

A method for making a liquid crystal display device in accordance with the present invention includes the steps of: forming a first conductive film on one of a pair of substrates, and patterning the first conductive film to form a gate electrode and a gate line; continuously forming a gate insulating film for covering the gate electrode and the gate line, a semiconductor film, an impurity-doped semiconductor film, and a second conductive film; patterning the second conductive film and the impurity-doped semiconductor film using a common mask to form a source electrode, a source line, and a drain electrode from the second conductive film and to form an ohmic contact layer from the impurity-doped semiconductor layer; forming an insulating film onto at least the source electrode, the source line, the drain electrode, and the semiconductor film; patterning the insulating film, the semiconductor film, and the gate insulating film using a common mask to form a thin film transistor to be in contact with a pixel electrode; depositing and then patterning a transparent conductive film on the non-deposited section of the substrate to form the pixel electrode; and enclosing a liquid crystal between said pair of substrates.

The method for making a liquid crystal display device in accordance with the present invention includes four patterning steps for forming the gate electrode and gate line (hereinafter these are referred to as a gate section); for forming the source electrode, the source line, and the drain electrode (hereinafter these are referred to as a source/drain) and the ohmic contact layer; for forming the insulating film and the semiconductor film to form the thin film transistor; and for forming the pixel electrode. Thus, the method requires only four photomasks.

In a conventional process, after patterning for forming the gate section, patterning of an island section, which defines the shape of the semiconductive active film, is performed. In the method in accordance with the present invention, the gate insulating film, the semiconductor film, the impurity-doped semiconductor film, and the second conductive film are continuously formed, and then the second conductive film and the impurity-doped semiconductor film are simultaneously patterned using a common photomask to form the source/drain and the ohmic contact layer. Further, the insulating film functioning as the passivation film and the gate insulating film are simultaneously patterned using another common photomask to form a thin film transistor. Finally, the transparent conductive film is patterned to form the pixel electrode.

Since a plurality of films are simultaneously patterned using a common photomask in the present invention, the method requires only four photomasks. In other words, the method in accordance with the present invention includes a four-mask process, whereas a conventional method includes a five-mask process. The method in accordance with the present invention results in a reduction in production costs and shortening of the production period.

Preferably, the first conductive film is selected from the group consisting of a chromium film, a composite film of an aluminum film with a chromium film deposited thereon, and a composite film of a molybdenum film with a chromium film deposited thereon; and the transparent conductive film comprises an indium tin oxide film.

Since aluminum and molybdenum are not resistant against ITO etching as described above, the gate section composed of such a metal is also etched during the ITO etching. Chromium is resistant against ITO etching, hence the gate section with a chromium surface layer is not etched during the ITO etching.

When an aluminum or molybdenum composite film with a surface chromium layer is used as the first conductive film, the side face of the aluminum or molybdenum gate pattern must be protected with a chromium film. Thus, the aluminum or molybdenum layer and the chromium layer cannot be simultaneously patterned without further treatment after depositing the chromium film on the aluminum or molybdenum film. That is, the aluminum or molybdenum film is patterned, the chromium film is deposited so as to cover the upper and side faces of the pattern, and then the chromium film is patterned. Thus, the method requires a five-mask process when a protective film is formed on the gate section. In contrast, the conventional method requires a six-mask process when the protective film is formed on the gate line. Accordingly, the method in accordance with the present invention contributes to a reduction in the number of photomasks used in the protective film configuration.

In the step of depositing the transparent conductive film on the non-deposited section of the substrate, a transparent conductive film, e.g. an ITO film may be simultaneously deposited on the gate line and on the region in which the gate electrode is exposed to form a gate protective film.

Such a configuration is based on a technical conception that the ITO transparent conductive film functions as a gate protective film during ITO etching, instead of the chromium film resistive against ITO etching. The configuration allows the use of aluminum or molybdenum that is not protected by the chromium layer. Patterning for leaving the ITO film on the gate line and the exposed region of the gate electrode is performed during the step of forming the pixel electrode using a photomask having an additional pattern. Thus, such a configuration permits a four-mask process, resulting in a further reduction in the number of photomasks.

The gate protective film may be formed while a transparent conductive film electrically connected to the gate electrode is simultaneously deposited on the insulating film to form an upper gate electrode.

Also, in such a configuration, the transparent conductive film composed of, for example, ITO can protect the gate section. Since this configuration forms a double-gate transistor in which the upper gate electrode is arranged above the gate electrode composed of the first conductive film with the insulating film placed therebetween, with the ON-current of the double-gate transistor being higher than that of a single-gate transistor, this configuration contributes to improved transistor characteristics.

First Embodiment

The first embodiment in accordance with the present invention will now be described with reference to FIGS. 1A to 1E and 2A to 2E. This embodiment includes a four-mask process for producing a liquid crystal display device having a reverse staggered thin film transistor array using a chromium single layer as a gate material. FIGS. 1A to 1E are cross-sectional views showing production steps of a thin film transistor array substrate of the liquid crystal display device and FIGS. 2A to 2E are plan views corresponding to the cross-sectional views of FIGS. 1A to 1E.

Figure 1B:
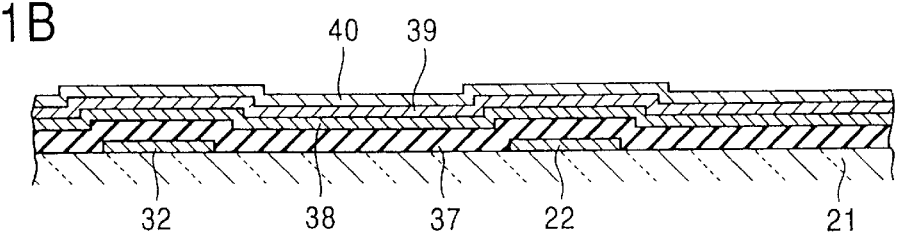
Figure 1C:
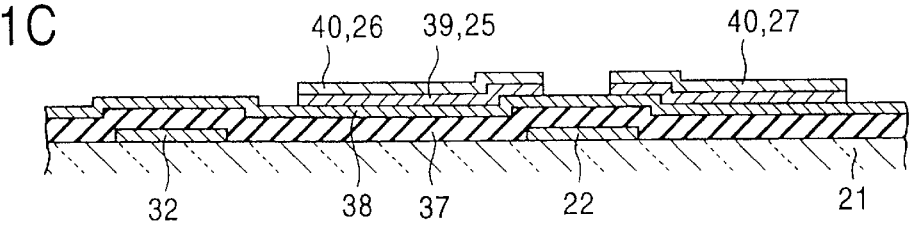
Figure 1D:
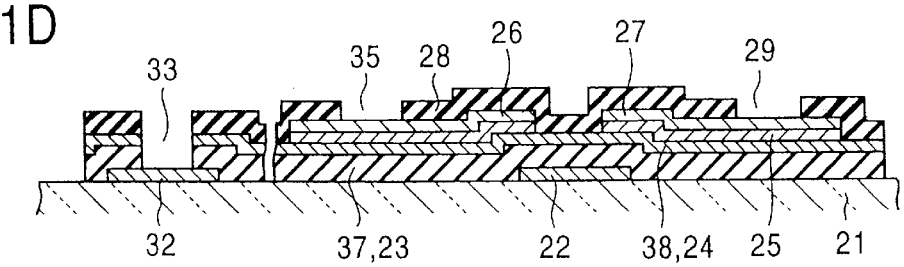
Figure 1E:
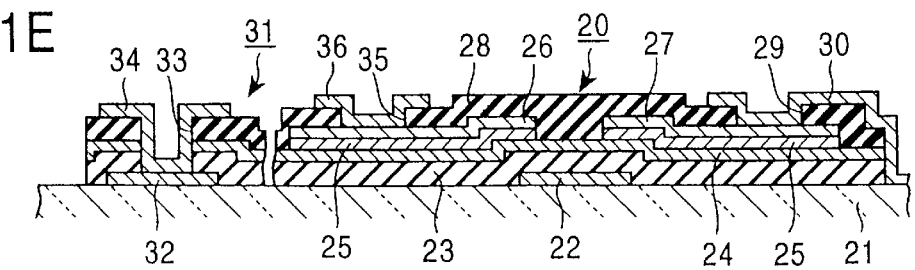
Figure 2A:
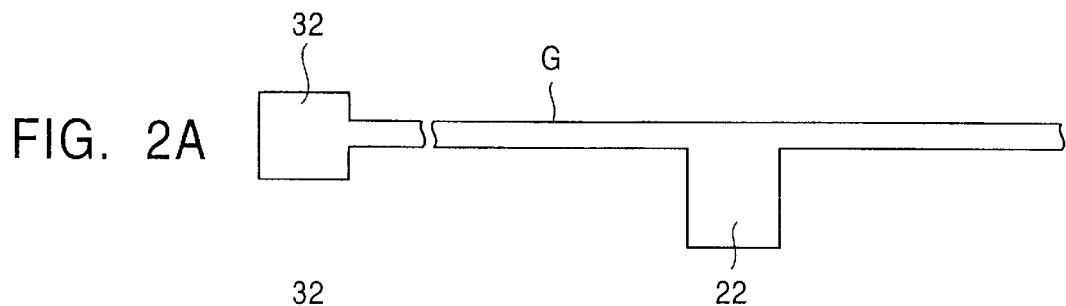
Figure 2C:
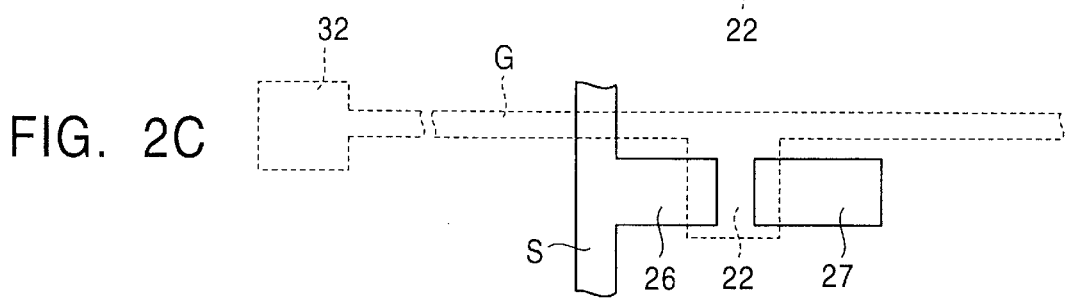
Figure 2D:
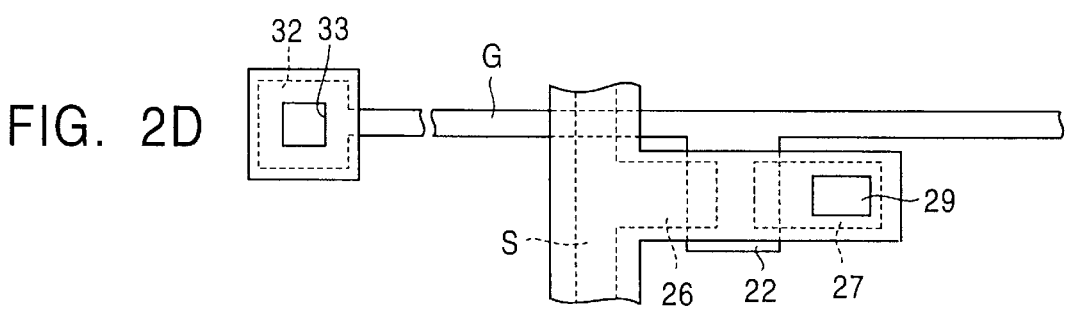
Figure 2E:
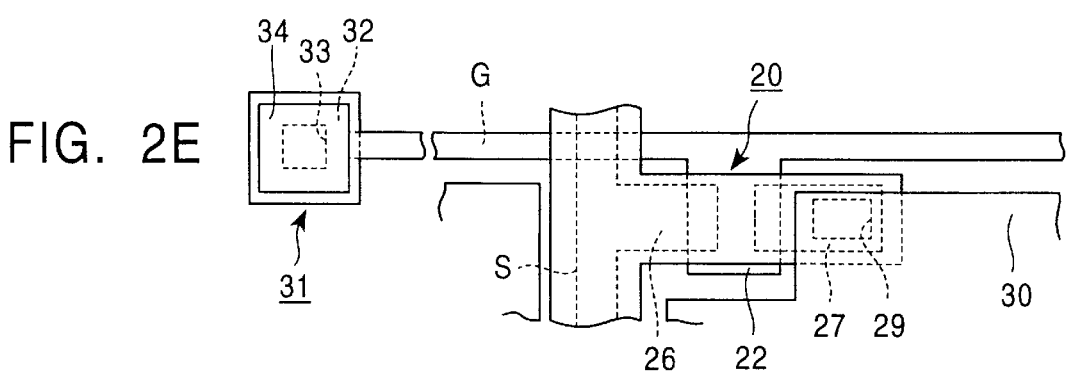

With reference to FIGS. 1E and 2E, in each thin film transistor, a gate electrode 22 extracted from a gate line G is formed on a glass substrate 21, and a $SiN_x$ gate insulating film 23 is formed to cover the gate electrode 22. In this embodiment, a chromium single film is used as a gate line material. A semiconductive active film 24 composed of amorphous silicon (a-Si) is formed on the gate insulating film 23 above the gate electrode 22. A source electrode 26 and a drain electrode 27 extracted from a source line S are formed on the semiconductive active film 24, an ohmic contact layer 25 intervening between the source and drain electrodes 26 and 27 and the semiconductive active film 24. The source line S, the source electrode 26 and the drain electrode 27 are composed of aluminum. A passivating film 28 composed of $SiN_x$ is formed to cover a thin film transistor 20 including the source electrode 26, the drain electrode 27, and the gate electrode 22. A contact hole 29 is formed in the passivating film 28 on the drain electrode 27, and a pixel electrode 30 composed of ITO is formed over the contact hole 29 and is electrically connected to the drain electrode 27.

With reference to FIGS. 1E and 2E, a gate terminal pad section 31 is arranged on one end of the gate line G at the left side of the drawings. A contact hole 33 is formed so as to pass through the gate insulating film 23, the a-Si film and the passivating film 28, which are formed on a lower pad layer 32 composed of the gate line material arranged on the glass substrate 21. An upper pad layer 34 composed of ITO is formed over the contact hole 33 and is electrically connected to the lower pad layer 32. In FIG. 1E, a source terminal pad section at one end of the source line S, which is located at the exterior of the display region, is depicted, as if an ITO layer 36 is connected to the source electrode 26 through a contact hole 35. A source terminal pad section does not belong to the thin film transistor 20, and thus the ITO layer 36 corresponds to the upper pad layer of the source terminal pad section.

With reference to FIGS. 1A and 2A, in producing the thin film transistor array substrate, a chromium first conductive film is deposited on a glass substrate 21, and patterned by a conventional photolithographic process to form a gate electrode 22 and a gate line G. A lower pad layer 32 is formed at the gate terminal pad section 31. With reference to FIGS. 1B and 2B, a $SiN_x$ film 37, an a-Si semiconductive film 38, an a-Si:n$^+$ film 39 (impurity-doped semiconductor film), and an aluminum film or a second conductive film 40 are formed on the entire substrate to cover the gate electrode 22 and the gate line G. These films can be continuously deposited under the same vacuum atmosphere using a deposition system. With reference to FIGS. 1C and 2C, a photoresist (not shown in the drawings) is applied onto the aluminum film 40, exposed through a photomask, and developed to form a resist pattern. Among the four layers, only two layers, that is, the aluminum layer 40 and the a-Si:n$^+$ film 39 are etched by using the resist pattern as a mask. As a result, a drain electrode 27, a source electrode 26, and a source line S are formed from the aluminum film 40, and an ohmic contact layer 25 is formed from the a-Si:n$^+$ film 39.

With reference to FIGS. 1D and 2D, a $SiN_x$ film as a passivating film 28 is deposited on the entire surface, and then a photoresist (not shown in the drawings) is applied thereon, exposed through a photomask, and developed to form a resist pattern. The $SiN_x$ film (the passivating film 28), the a-Si film 38 (the semiconductive active film 24), and the $SiN_x$ film 37 (the gate insulating film 23) are etched by using the resist pattern as a photomask. The passivating film 28, the semiconductive active film 24, and the gate insulating film 23 are thereby formed so that the ends of these layers are arranged at the same position. During the etching of the passivating film 28 in this step, the passivating film 28 is partly opened to form a contact hole 29 above the drain electrode 27, to form a contact hole 33 above the lower pad layer 32 at the gate terminal pad section 31, and to form a contact hole 25 above the source terminal pad section. The contact hole 29 electrically connects the drain electrode 27 and the pixel electrode 30, and the contact holes 33 and 35 electrically connect the lower pad layer 32 and the upper pad layer 34. Although aluminum in the contact holes is exposed during the step for etching the passivating film 28 to form the contact holes, it is not etched during the subsequent etching step of the a-Si film 38 or the gate insulating film 23.

With reference to FIGS. 1E and 2E, an ITO film is deposited on the entire surface and patterned by a conventional lithographic process to form a pixel electrode 30, an upper pad layer 34 at the gate terminal pad section 31, and an upper pad layer 36 at the source terminal pad section. A thin film transistor array substrate is thereby formed. A counter substrate having a common electrode is prepared, and then a liquid crystal is enclosed between the thin film transistor array substrate and the counter substrate to form a liquid crystal display device.

The process in this embodiment requires only four patterning processes and thus four photomasks for forming the gate, for forming the source/drain and the ohmic contact layer, for forming the insulating film and the semiconductive active film, and for forming the pixel electrode. Thus, a liquid crystal display device can be produced with reduced material and process costs and a shortened production time.

In this embodiment, a major portion of the gate line G and one end of the gate electrode 22 are exposed during the patterning of the insulating film and the semiconductive active film. Since chromium having high resistance against ITO etching is used as the gate line material, these exposed sections are not etched during such a patterning step.

Second Embodiment

A second embodiment in accordance with the present invention will now be described with reference to FIGS. 3A to 3E and 4A to 4E. The gate material used in this embodiment is a composite film composed of an aluminum underlayer and a surface chromium layer in place of the chromium single layer in the first embodiment. Thus, the second embodiment allows a five-mask process. FIGS. 3A to 3E are cross-sectional views showing production steps of a thin film transistor array substrate and FIGS. 4A to 4E are plan views corresponding to the cross-sectional views of FIGS. 3A to 3E. Elements having the same functions as in FIGS. 1A to 1E and 2A to 2E are referred to with the same identification numbers, and a detailed description thereof with reference to drawings has been omitted.

Figure 3A:
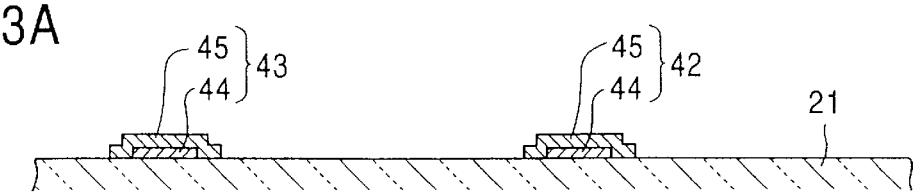
FIGS. 3A to 3E are cross-sectional views showing production steps of a thin film transistor array substrate of a liquid crystal display device in accordance with a second embodiment of the present invention.
Figure 3B:
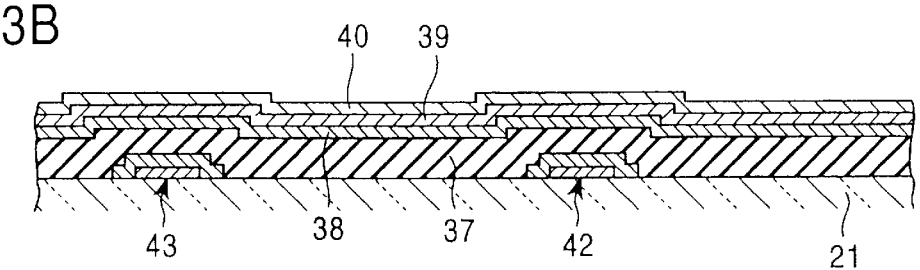
Figure 3C:
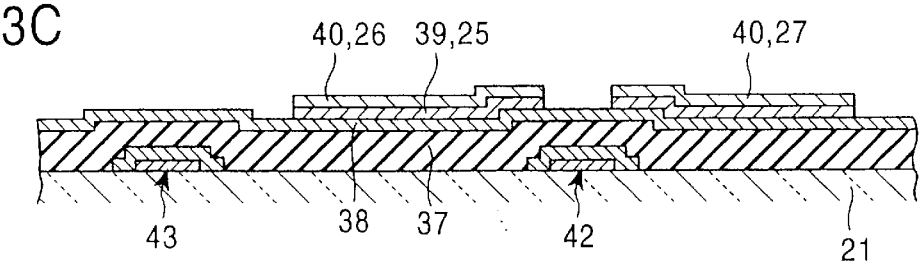
Figure 3D:
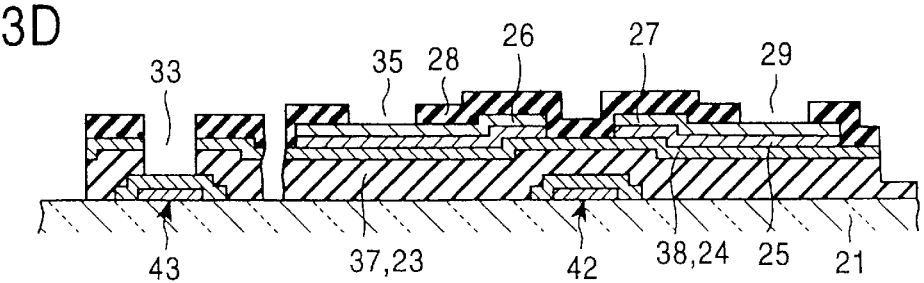
Figure 3E:
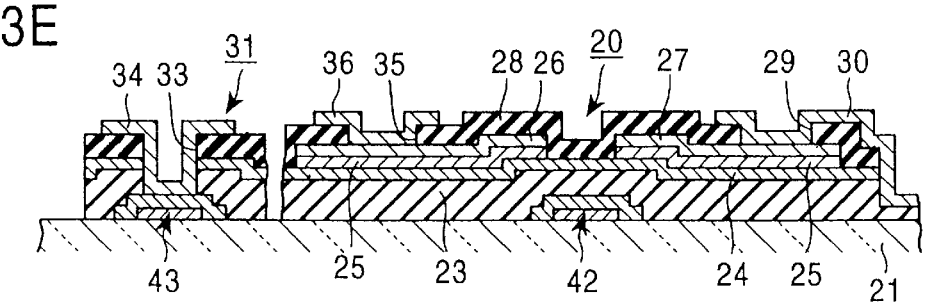

The thin film transistor shown in FIG. 3E is also of a reverse staggered type. In this embodiment, a gate electrode 42 and a gate line G1 on the glass substrate 21, and a lower pad layer 43 at the gate terminal pad section 31 are formed of a composite film which is composed of an aluminum film 44 covered with a chromium film 45. The remaining configuration is the same as that in the first embodiment.

Figure 4A:
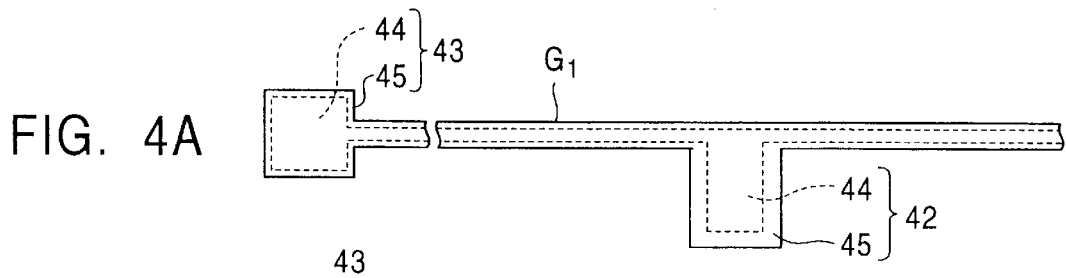
FIGS. 4A to 4E are plan views corresponding to the cross-sectional views of FIGS. 3A to 3E.

In the production of the thin film transistor array substrate, as shown in FIGS. 3A and 4A, the aluminum film 44 is deposited on a glass substrate 21 and patterned by a conventional photolithographic process to form an underlayer for a gate electrode 42 and a gate line G1. Next, a chromium film 45 is deposited on the entire surface and patterned by a photolithographic process to form an overlayer for the gate electrode 42 and the gate line G1, such that the patterning width of the overlayer is greater than that of the underlayer.

Figure 4B:
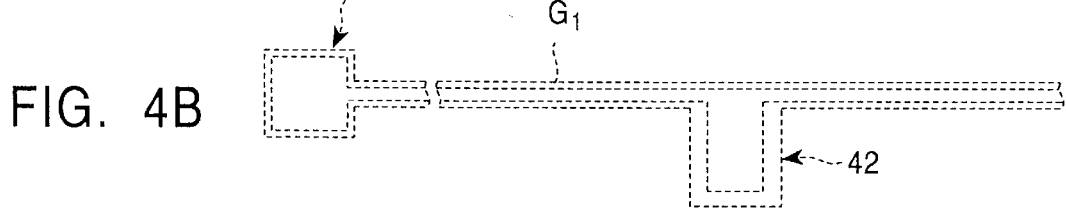
Figure 4C:
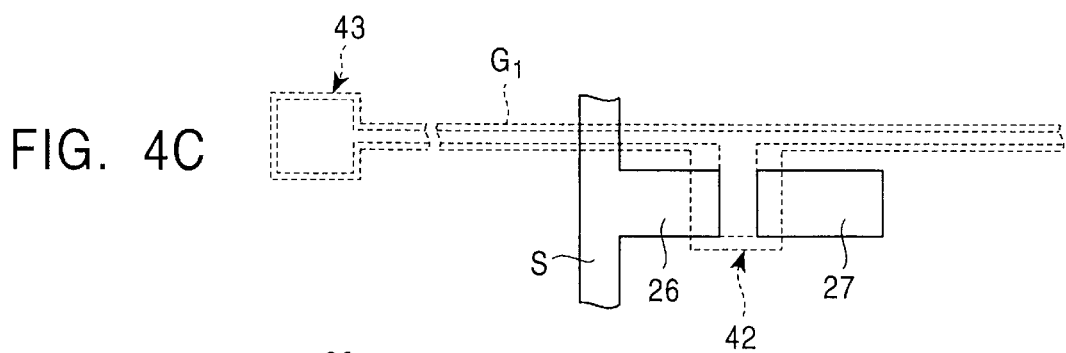
Figure 4D:
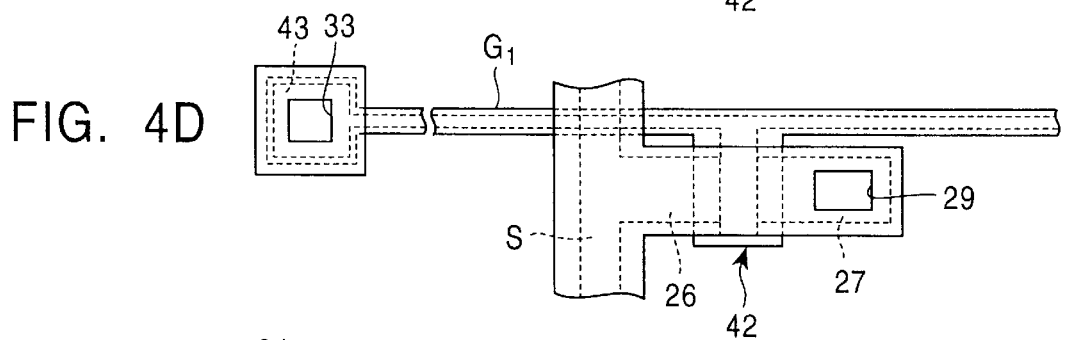

The subsequent steps are the same as those in the first embodiment. With reference to FIGS. 3B and 4B, a $SiN_x$ film 37, an a-Si semiconductive film 38, an a-Si:n$^+$ film 39, and an aluminum film 40 are formed on the entire surface. With reference to FIGS. 3C and 4C, the aluminum layer 40 and the a-Si:n$^+$ film 39 are etched by using a mask, so that a drain electrode 27, a source electrode 26, and a source line S are formed from the aluminum film 40 and an ohmic contact layer 25 is formed from the a-Si:n$^+$ film 39. With reference to FIGS. 3D and 4D, a $SiN_x$ film is deposited on the entire surface, and then the $SiN_x$ film (the passivating film 28), the a-Si film 38 (the semiconductive active film 24), and the $SiN_x$ film 37 (the gate insulating film 23) are patterned using a photomask. In this step, a contact hole 29 electrically connecting the drain electrode 27 and a pixel electrode 30, and contact holes 33 and 35 electrically connecting the lower pad layer 43 and the upper pad layer 34 are formed.

Figure 4E:
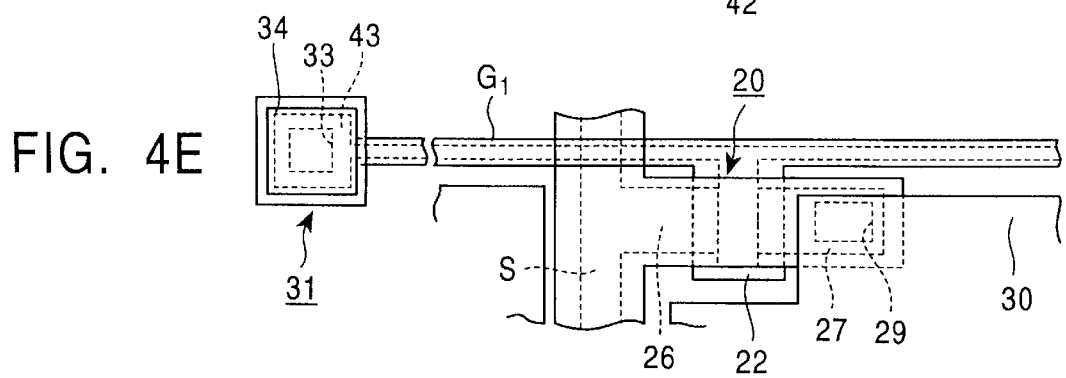

With reference to FIGS. 3E and 4E, an ITO film is deposited on the entire surface and patterned by a conventional lithographic process to form a pixel electrode 30, an upper pad layer 34 at the gate terminal pad section 31, and an upper pad layer 36 at the source terminal pad section. A thin film transistor array substrate is thereby formed. A counter substrate having a common electrode is prepared, and then a liquid crystal is enclosed between the thin film transistor array substrate and the counter substrate to form a liquid crystal display device.

A composite film composed of an aluminum underlayer and a chromium overlayer is used as a gate material in this embodiment. In such a configuration, the aluminum underlayer and the chromium overlayer cannot be simultaneously patterned, because the side wall of the underlying aluminum gate pattern must be protected by a chromium layer. Thus, the aluminum underlayer is patterned, and then the chromium overlayer is deposited thereon and then patterned. Thus, this gate-forming step requires two masks. As a result, the second embodiment allows a five-mask process. Since a conventional process for the composite film gate material requires a six-mask process, the second embodiment still has advantages, that is, reduced material and process costs and a shortened production time.

Since aluminum has lower resistivity than chromium, the line resistance of the thin film transistor array is lower than that of the first embodiment in which the gate line is composed of only chromium. In this embodiment, molybdenum, which also has lower resistivity than chromium, can be substituted for aluminum in the composite gate material.

Third Embodiment

A third embodiment in accordance with the present invention will now be described with reference to FIGS. 5A to 5E. In this embodiment, the ITO protective film is etched so that the ITO film as the gate protective film remains not only on the pixel electrode and the terminal pad sections but also on the gate line and on the exposed end of the gate electrode. This embodiment allows a four-mask process.

The cross-sectional views shown in FIGS. 1A to 1E are also used for describing the method for making the thin film transistor array substrate in this embodiment. FIGS. 5A to 5E are plan views corresponding to the cross-sectional views of FIGS. 1A to 1E. Elements having the same function as in FIGS. 2A to 2E are referred to with the same identification numbers, and a detailed description thereof with reference to drawings has been omitted.

Figure 5A:
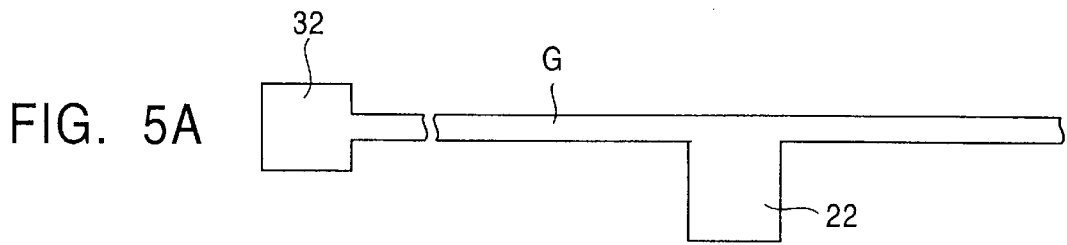
FIGS. 5A to 5E are plan views showing production steps of a thin film transistor array substrate of a liquid crystal display device in accordance with a third embodiment of the present invention.
Figure 5B:
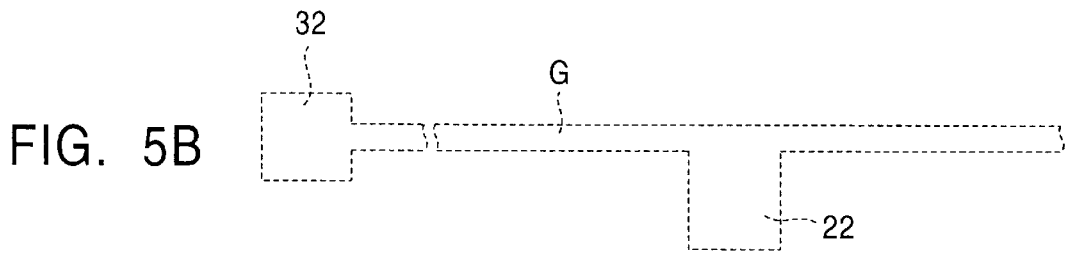
Figure 5C:
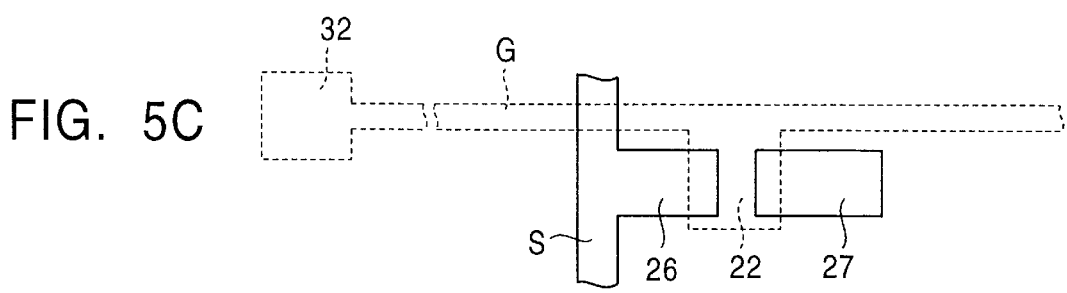

The steps of forming the gate section to the source/drain are shown in FIGS. 5A, 5B, and 5C (their cross-sectional views are shown in FIGS. 1A, 1B, and 1C) and are the same as those in the first embodiment. This embodiment, however, allows the use of an aluminum single layer as a gate material in place of the chromium single layer in the first embodiment.

Figure 5D:
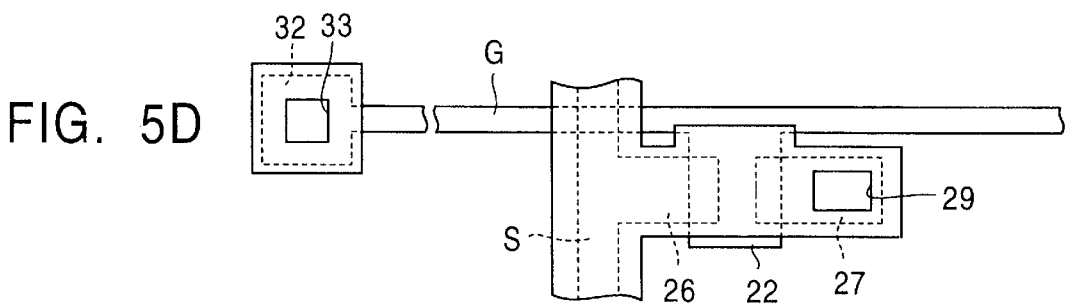

With reference to FIG. 5D, in the patterning step of the SiN$_x$ film (the passivating film 28), the a-Si film 38 (the semiconductive active film 24), and the SiN$_x$ film 37 (the gate insulating film 23), the plan view of the resulting pattern is different from that in FIG. 2D, although the cross-sectional view is the same as that in FIG. 1D. In this embodiment, the extending section of the pattern which covers the thin film transistor 20 is partly extended to the gate line G and superimposed on it at the base section of the gate electrode 22, whereas the pattern in the first embodiment does not have such a superimposed portion.

With reference to 5E, the ITO film 47 in this embodiment remains on the gate line G and the end of the gate electrode 22 exposed from the passivating film 28, in addition to the pixel electrode 30 and the terminal pad layers 34 and 36 as in the first embodiment.

In the first embodiment, chromium resistive against ITO etching is used as the gate material. In the second embodiment, aluminum, not resistive against ITO etching, covered with chromium is used as the gate material. In the third embodiment, the aluminum gate section is covered with the ITO film 47 so that the gate section is not exposed during the ITO etching. Thus, the ITO film 47 functions as a gate protective film during the ITO etching and protects the gate section from etching.

According to the third embodiment, the gate line is composed of an aluminum single film, hence the resistance of the gate line is further decreased. The patterning of the ITO film can be simultaneously performed using a photomask including an additional pattern in the step of forming the pixel electrode. This embodiment also has the advantages of low-cost production with a shortened time. The gate material in this embodiment may be molybdenum or chromium in place of aluminum.

Fourth Embodiment

A fourth embodiment in accordance with the present invention will now be described with reference to FIGS. 6A to 6E. The process in this embodiment resembles that in the third embodiment. The ITO layer remains on the entire region of the gate electrode in this embodiment, whereas it remains only on the exposed region of the gate electrode. FIGS. 6A to 6E are plan views showing the production steps of a thin film transistor array substrate. Elements having the same functions as in FIGS. 5A to 5E are referred to with the same identification numbers, and a detailed description thereof with reference to drawings has been omitted.

Figure 5E:
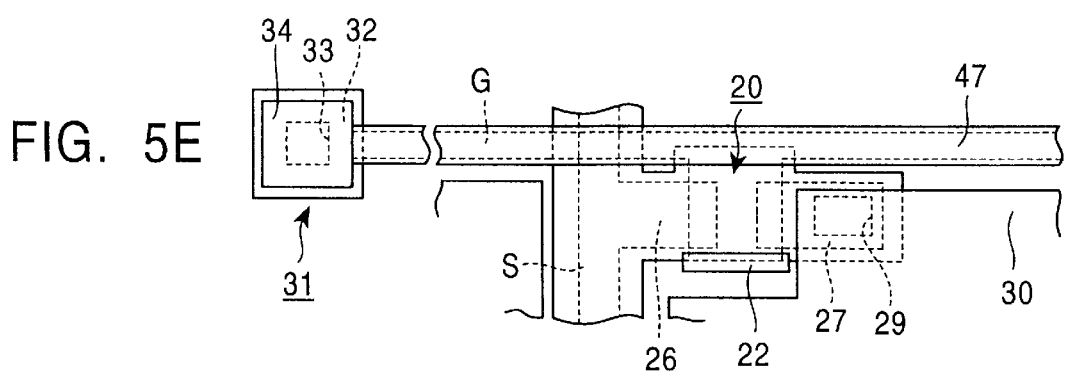
Figure 6A:
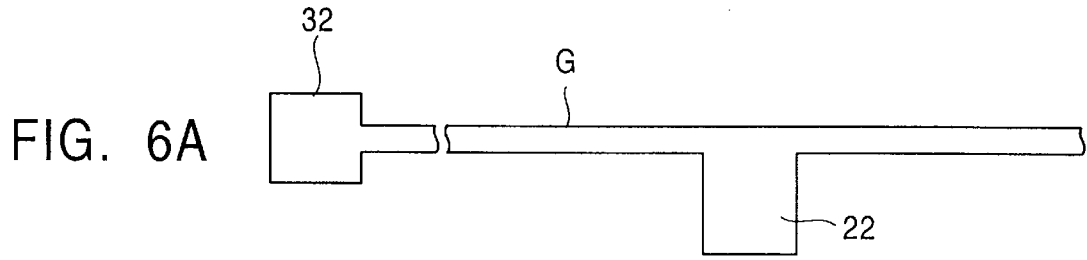
FIGS. 6A to 6E are plan views showing production steps of a thin film transistor array substrate of a liquid crystal display device in accordance with a fourth embodiment of the present invention.
Figure 6B:
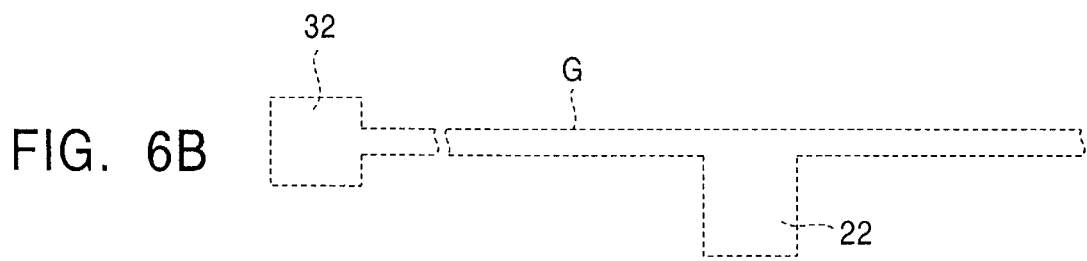
Figure 6C:
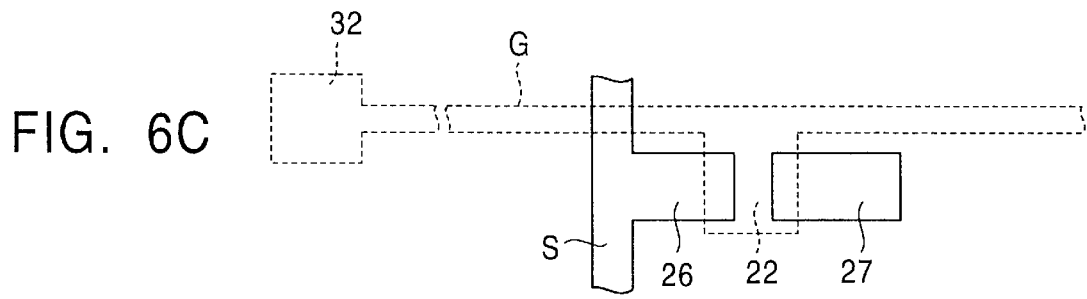
Figure 6D:
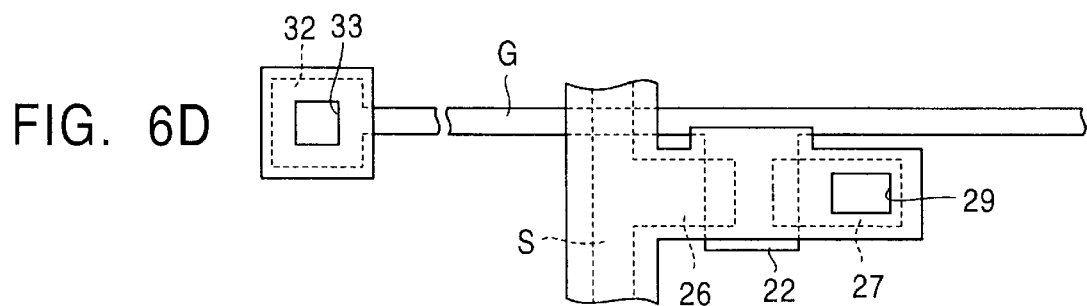
Figure 6E:
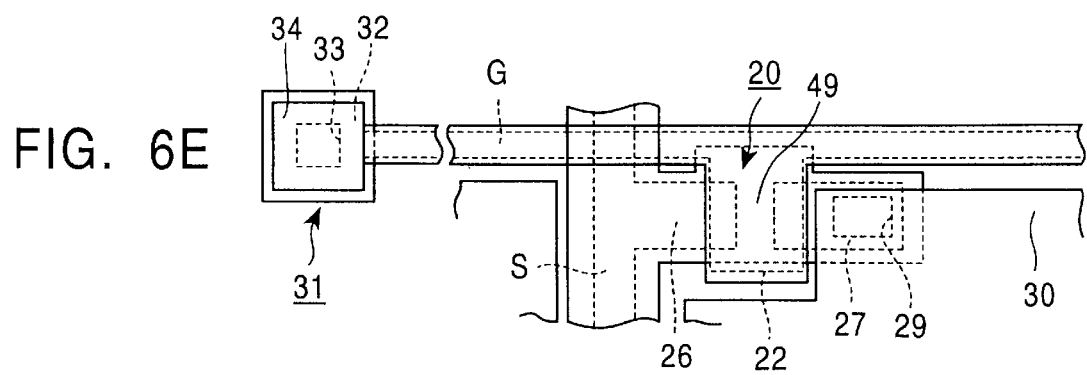
Figure 7A:
FIGS. 7A to 7E are cross-sectional views showing production steps of a conventional thin film transistor array substrate of a liquid crystal display device.
Figure 7B:
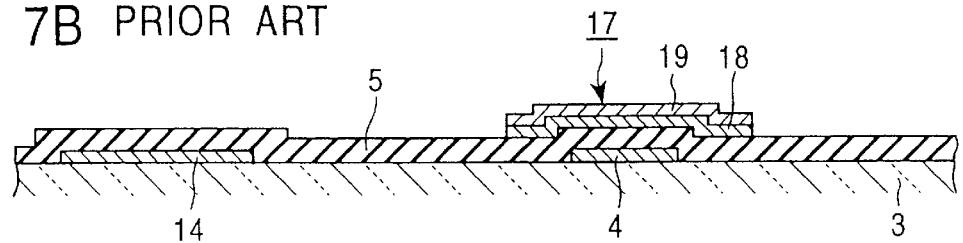
Figure 7C:
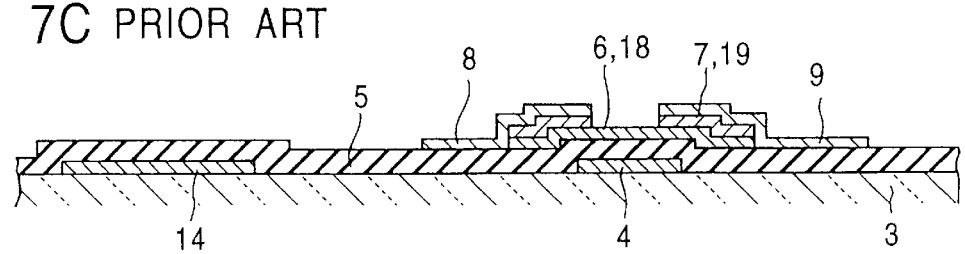
Figure 7D:
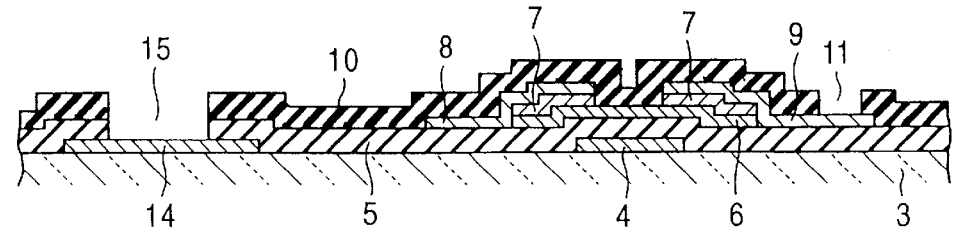
Figure 7E:
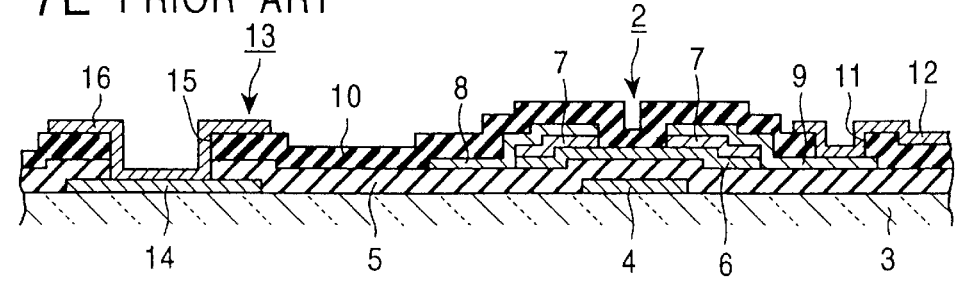
Figure 8A:
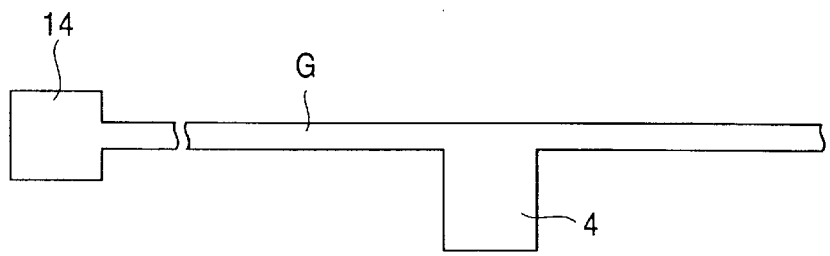
FIGS. 8A to 8E are plan views corresponding to the cross-sectional views of FIGS. 7A to 7E.
Figure 8B:
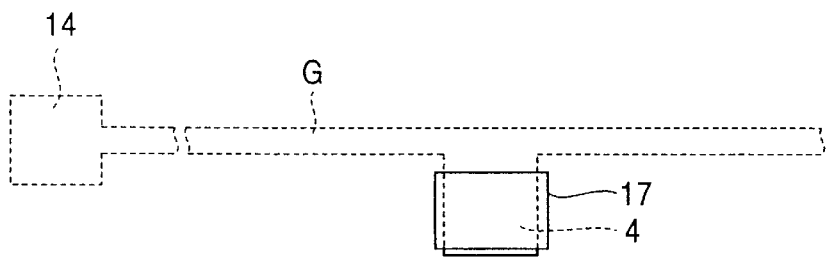
Figure 8C:
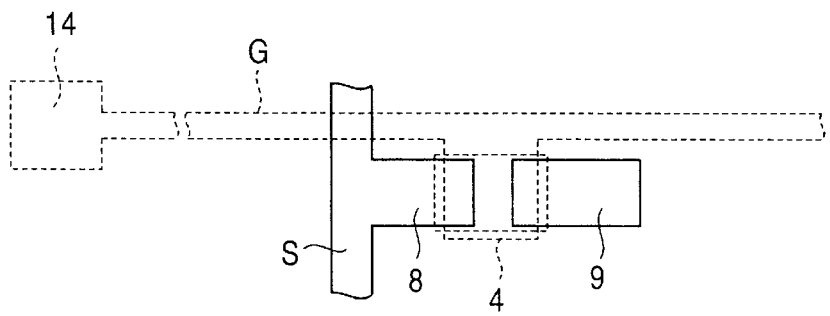
Figure 8D:
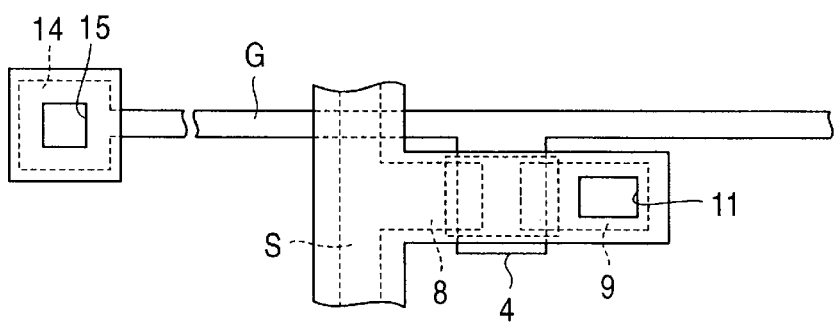
Figure 8E:
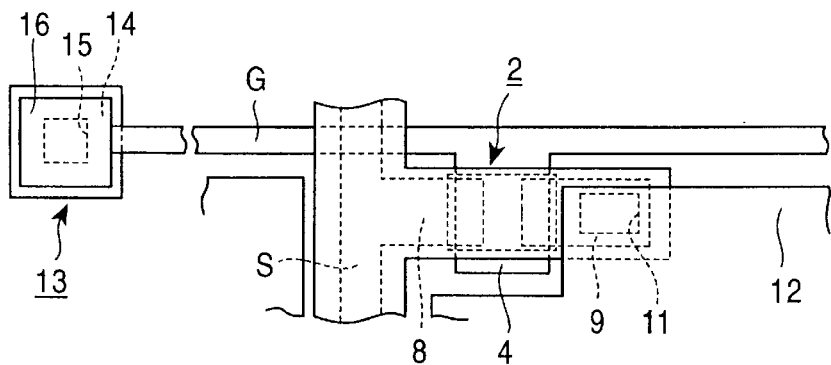

As shown in FIG. 5E, in the third embodiment, the ITO film 47 remains on the gate line G and on the end of the gate electrode 22 exposed from the passivating film 28. In contrast, in this embodiment, the ITO film 49 remains on the entire region of the gate electrode 22, as shown in FIG. 6E. That is, the ITO pattern extends from the gate line G towards the end of the gate electrode 22, and thus has a similar shape to that of the aluminum film constituting the gate line G and the gate electrode 22.

This embodiment also protects the exposed region of the gate section from etching, since the ITO film 49 functions as a protective film for the gate line G and the exposed region of the gate line G, as in the third embodiment. This embodiment allows a four-mask process with reduced production costs and a shortened production time. In the thin film transistor of this embodiment, the gate insulating film, the source electrode, the drain electrode and the passivating film intervene between the ITO film 49 and the aluminum gate electrode 22. Thus, the ITO film 49 above the gate electrode 22 functions as not only a gate protective film but also as an upper gate electrode. That is, the thin film transistor has a double-gate configuration. Such a configuration results in an increased ON-current of the transistor and thus, improved transistor characteristics. The gate material in this embodiment may be molybdenum or chromium instead of aluminum.

The present invention is not limited to the above-mentioned embodiments and can include various modifications within a scope not deviating from the spirit of the present invention. For example, any materials can be used for individual layers, such as the gate insulating film and the passivation film, according to required characteristics.

What is claimed is:

1. A method for making a liquid crystal display device comprising the steps of:

forming a first conductive film on one of a pair of substrates, and patterning the first conductive film to form a gate electrode and a gate line;

continuously forming a gate insulating film for covering the gate electrode and the gate line, a semiconductor film, an impurity-doped semiconductor film, and a second conductive film;

patterning the second conductive film and the impurity-doped semiconductor film using a common mask to form a source electrode, a source line, and a drain electrode from the second conductive film and to form an ohmic contact layer from the impurity-doped semiconductor layer;

forming an insulating film onto at least the source electrode, the source line, the drain electrode, and the semiconductor film;

patterning the insulating film, the semiconductor film, and the gate insulating film using a common mask to form a thin film transistor to be in contact with a pixel electrode;

depositing and then patterning a transparent conductive film on the non-deposited section of the substrate to form the pixel electrode; and enclosing a liquid crystal between said pair of substrates.

2. A method for making a liquid crystal display device according to claim 1, wherein the first conductive film is selected from the group consisting of a chromium film, a composite film of an aluminum film with a chromium film deposited thereon, and a composite film of a molybdenum film with a chromium film deposited thereon; and the transparent conductive film comprises an indium tin oxide film.

3. A method for making a liquid crystal display device according to claim 1, wherein in the step of depositing the transparent conductive film on the non-deposited section of the substrate, the transparent conductive film is simultaneously deposited on the gate line and on the region in which the gate electrode is exposed to form a gate protective film.

4. A method for making a liquid crystal display device according to claim 3, wherein the gate protective film is formed while a transparent conductive film electrically connected to the gate electrode is simultaneously deposited on the insulating film to form an upper gate electrode.

* * * * *